(12) United States Patent
Baldwin et al.

(10) Patent No.: US 12,098,733 B2
(45) Date of Patent: Sep. 24, 2024

(54) FAN SHROUD, MOUNTING BRACKET, AND PIN MOUNT

(71) Applicant: Modine Manufacturing Company, Racine, WI (US)

(72) Inventors: Daniel R. Baldwin, Muskego, WI (US); Shaun M. McKanry, Mount Pleasant, WI (US); Michael J. Kis, Sturtevant, WI (US)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 18/330,921

(22) Filed: Jun. 7, 2023

(65) Prior Publication Data

US 2023/0400040 A1   Dec. 14, 2023

Related U.S. Application Data

(60) Provisional application No. 63/350,103, filed on Jun. 8, 2022.

(51) Int. Cl.
*B60K 11/04* (2006.01)
*B60K 11/06* (2006.01)
(Continued)

(52) U.S. Cl.
CPC ............ *F04D 29/644* (2013.01); *B60K 11/04* (2013.01); *B60K 11/06* (2013.01); *F01P 5/06* (2013.01);
(Continued)

(58) Field of Classification Search
CPC .... F04D 29/644; F04D 19/002; F04D 29/703; B60K 11/04; B60K 11/06; F01P 5/06; F01P 11/10
See application file for complete search history.

(56) References Cited

U.S. PATENT DOCUMENTS 4,018,297 A   4/1977   Haupt
4,741,669 A   5/1988   Shimokawabe
(Continued)

FOREIGN PATENT DOCUMENTS

CN   206099592 U   4/2017
CN   206555350 U   10/2017
(Continued)

OTHER PUBLICATIONS

Invitation To Pay Additional Fees for Application No. PCT/US2023/068072 dated Sep. 22, 2023 (17 pages).
(Continued)

*Primary Examiner* — Sabbir Hasan
*Assistant Examiner* — Andrew J Marien
(74) *Attorney, Agent, or Firm* — Michael Best & Friedrich LLP

(57) ABSTRACT

A shroud assembly mounts a radiator to a vehicle frame. The shroud assembly includes a shroud, a first frame bracket for mounting the shroud to the vehicle frame, and a second frame bracket for mounting the shroud to the vehicle frame. The shroud includes a first shroud portion and a second shroud portion. The first shroud portion has an opening for receiving a fan. The second shroud portion has an opening for receiving a fan. The first mounting bracket connects the first shroud portion to the second shroud portion, and the second mounting bracket also connects the first shroud portion to the second shroud portion.

20 Claims, 14 Drawing Sheets

(51) Int. Cl.
  *F01P 5/06* (2006.01)
  *F01P 11/10* (2006.01)
  *F04D 19/00* (2006.01)
  *F04D 29/64* (2006.01)
  *F04D 29/70* (2006.01)

(52) U.S. Cl.
  CPC .......... *F01P 11/10* (2013.01); *F04D 19/002* (2013.01); *F04D 29/703* (2013.01)

(56) References Cited

U.S. PATENT DOCUMENTS

| | | | | |
|---|---|---|---|---|
| 5,671,803 | A * | 9/1997 | Tepas | B60K 11/04 165/41 |
| 5,775,450 | A * | 7/1998 | Porter | B60K 11/02 180/68.1 |
| 6,189,492 | B1 * | 2/2001 | Brown | B60S 1/50 123/41.49 |
| 7,150,335 | B2 | 12/2006 | Sasano et al. | |
| 2004/0069442 | A1 * | 4/2004 | Yagi | F28F 9/002 165/41 |
| 2006/0272800 | A1 | 12/2006 | Wong et al. | |
| 2007/0277752 | A1 | 12/2007 | Smith et al. | |
| 2011/0067845 | A1 | 3/2011 | Bishop | |
| 2014/0251706 | A1 * | 9/2014 | Shibutani | B60K 11/04 180/68.4 |
| 2016/0090899 | A1 * | 3/2016 | Hayes | F02B 29/0431 165/51 |
| 2021/0363911 | A1 * | 11/2021 | Kim | F01P 3/18 |
| 2022/0176805 | A1 * | 6/2022 | Kis | B60K 11/04 |
| 2023/0272735 | A1 * | 8/2023 | Kis | F01P 11/10 165/120 |

FOREIGN PATENT DOCUMENTS

| | | |
|---|---|---|
| CN | 112160827 A | 1/2021 |
| CN | 110380574 B | 11/2021 |
| CN | 215751882 U | 2/2022 |
| KR | 102096515 B1 | 4/2020 |

OTHER PUBLICATIONS

International Search Report and Written Opinion for Application No. PCT/US2023/068072 dated Nov. 13, 2023 (21 pages).
Carparts.com, "Fan Shroud—Upper and Lower, For Radiator Fan, Diesel Engine", <https://www.carparts.com/fan-shroud/replacement/SET-REPC160304-2?TID=gglpla&origin=pla&utm_source=google&utm_medium=pla&utm_campaign=221983653&gclid=EAlaIQobChMIh7atjITJ9gIVVBZMCh09AwHdEAQYAyABEgJEavD_BwE&gclsrc=aw.ds> Accessed on Oct. 3, 2023, (5 pages).

* cited by examiner

FAN SHROUD, MOUNTING BRACKET, AND PIN MOUNT

CROSS-REFERENCE TO RELATED APPLICATION(S)

This application claims priority to U.S. Provisional Application No. 63/350,103, filed on Jun. 8, 2022, the entire contents of which are fully incorporated herein by reference.

BACKGROUND

The present disclosure relates to vehicle components, and more specifically to fan shrouds for motor vehicles. This disclosure relates to vehicle powertrain heat exchanger modules and vehicle heat exchange systems for regulating the temperature of vehicle components, and especially to the way that such heat exchanger modules are mounted to the vehicle. More specifically, this disclosure relates to fan shrouds and fan shroud assemblies for motor vehicles. Heat exchanger modules have been mounted to vehicles by module frames which attach to the vehicle at the vehicle frame or other location and on which the heat exchangers are attached and supported. Some designs require extra structural supports, like struts or tie bars, or extra support via structure or configuration of tanks of the heat exchangers.

SUMMARY

In some embodiments, the combination of heat exchanger modules and a structural shroud offers advantages to the structure of a vehicle heat exchange system. The structural shroud provides structural support to the overall heat exchanger system. This improved design over a conventional frameless heat exchanger mounting design provides rigid mount support to heat exchangers even when the heat exchangers have varying heights. For example, based on other vehicle requirements, a charge air cooler may be of a design that is shorter in length than a radiator core. Conventional designs may require extensions from the bottom of, for example, charger air cooler tanks, to mount to the radiator core. These extensions can be structurally vulnerable.

Conventional frameless heat exchanger mounting designs are also known to be structurally vulnerable. In conventional designs, stresses from normal use are absorbed by a heat exchanger tube or header, channels (e.g., steel channels) that house the radiator, cross braces that connect a radiator corner to the vehicle frame or other mounting location, and/or the radiator itself. Damaging loads applied by a vehicle onto the heat exchangers are removed or mitigated by the structural shroud as disclosed. The structural support provided by the structural shroud reduces the loads on these components, or in some embodiments, replaces these components entirely.

In one embodiment a shroud assembly includes a fan, a radiator, and a two-piece fan shroud that directs airflow generated by the fan over the radiator. The pieces of the two-piece fan shroud are held together by a bracket. The bracket mounts the entire fan shroud assembly to a vehicle. The vehicle can be a motor vehicle. More specifically, the motor vehicle can be a vehicle with an electric motor or a vehicle with an internal combustion engine, or a vehicle with both an electric motor and an internal combustion engine.

A cooling module includes, in one aspect, a shroud assembly, a radiator, and a fan. The shroud assembly includes a shroud, a first mounting bracket, and a second mounting bracket. The shroud includes a first shroud portion having a first opening that is hemispherical and second shroud portion having a second opening that is hemispherical. The first mounting bracket mechanically joins the first shroud portion and the second shroud portion, and the second mounting bracket mechanically joins the first shroud portion and the second shroud portion. The radiator is mounted between the first shroud portion and the second shroud portion such that the first and second mounting bracket, in mechanically joining the first shroud portion and the second shroud portion, also retain the radiator between the first shroud portion and the second shroud portion. The fan is mounted within at least one of the first portion and the second portion, the fan being configured to pass air through the shroud and over the radiator. The first and second mounting bracket are configured to attach the shroud assembly, the radiator, and the fan to a vehicle frame.

A shroud assembly includes, in another aspect combinable with the first, a shroud, a first mounting bracket, and a second mounting bracket. The shroud includes a first shroud portion having a first opening that is hemispherical and second shroud portion having a second opening that is hemispherical. The first mounting bracket mechanically joins the first shroud portion and the second shroud portion, and the second mounting bracket mechanically joins the first shroud portion and the second shroud portion.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
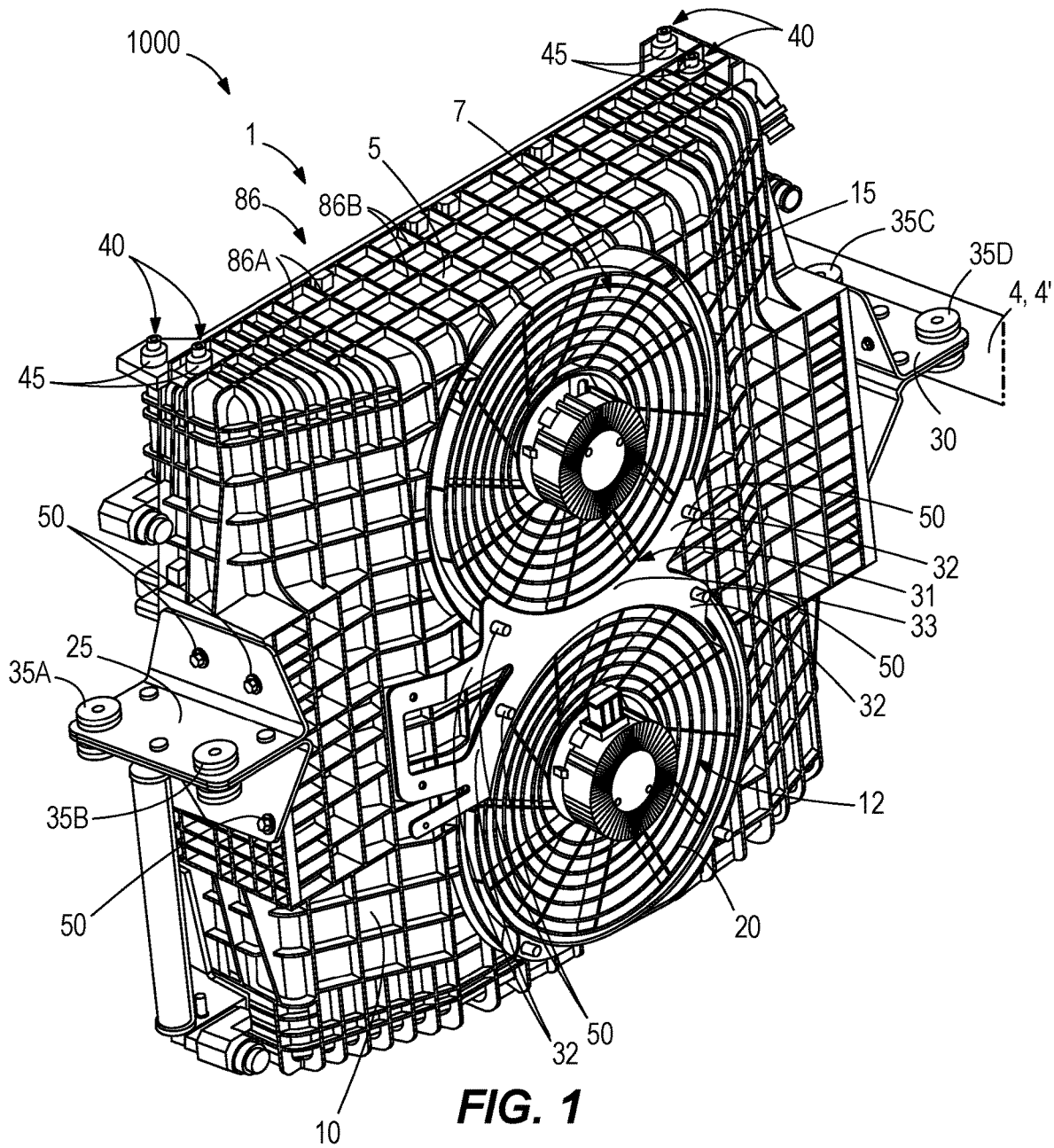
FIG. 1 is a front isometric view of a cooling module with a shroud assembly.

FIG. 1 illustrates a cooling module 1000 with a shroud assembly 1. The shroud assembly 1 includes a first shroud portion 5 and a second shroud portion 10. The first shroud portion 5 and the second shroud portion 10 are mated together to direct flow from a fan, for example a first fan 15, over radiators 55, 65, 75 (See FIG. 2) so that heat exchange can occur between the air directed by the fan 15 and the radiators 55, 65, 75. In one embodiment, the first and second shroud portions 5, 10 are similar or the exact same, which results in specific advantages over other known radiator shrouds in the art. Such advantages include ease of manufacturing, since only one die is needed to produce both the first and second shroud portions 5, 10, and ease of assembly, since an assembler does not have to install the first and second shroud portions 5, 10 in any specific manner, instead, the two components are interchangeable.

Figure 2:
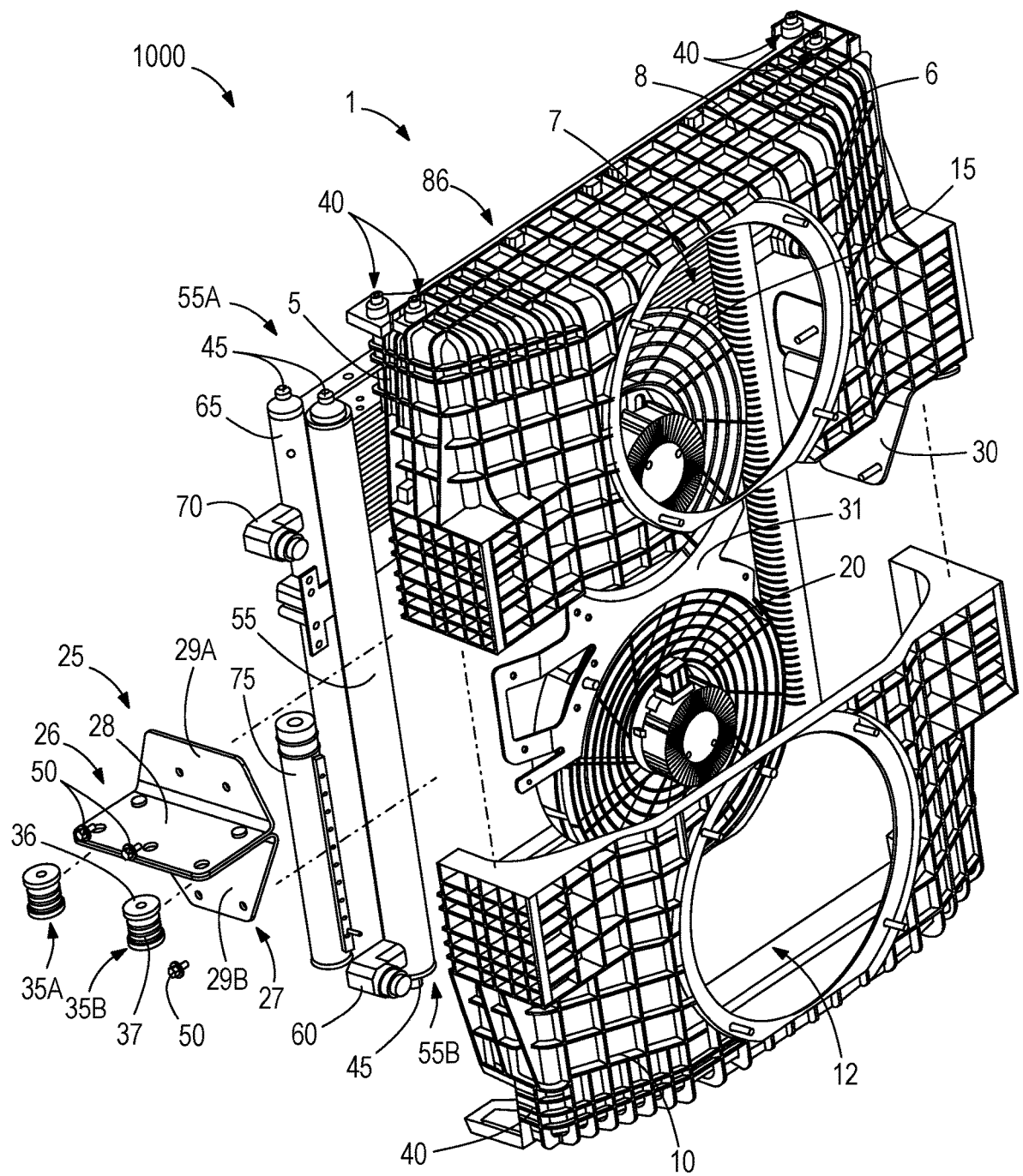
FIG. 2 is a front assembly view of the cooling module of FIG. 1.

Each of the first and second shroud portions 5, 10 has a fan opening, shown as the first shroud portion fan opening 7 and the second shroud portion fan opening 12. The illustrated first and second shroud portion fan openings 7, 12 are hemispherical in shape. The first and second shroud portion fan openings 7, 12 receive the first fan 15 and a second fan 20 respectively therein. The first and second fans 15, 20 are mounted directly to the respective first and second shroud portions 5, 10. As best shown in FIG. 2, the first and second shroud portions 5, 10 direct airflow generated by the first and second fans 15, 20 over the radiators 55, 65, 75. The first and second fans 15, 20, together with the radiators 55, 65, 75 and the shroud assembly 1, are the major components of the cooling module 1000.

The first and second shroud portions 5, 10 can include a lattice structure 86 formed from a plurality of walls 86A, 86B crossing at oblique angles to one another. The lattice structure 86 provides additional strength to the first and second shroud portions 5, 10, but without adding significant additional weight. While the plurality of walls 86A, 86B intersect at right angles in FIG. 1, the same effect can be achieved through the use of walls 86A, 86B intersecting at other angles.

Each of the first and second shroud portions 5, 10 include a flow direction portion 6 and a closure portion 8. The flow direction portion 6 extends in an arcuate manner from the opposite ends of where a radiator 55 is mounted, for example, opposite ends 55A, 55B of the first radiator 55 as shown in FIG. 2. Flow is directed from the first and second fans 15, 20 over the radiators 55, 65, 75 mounted on the combined first and second shroud portions 5, 10. In other embodiments, more or less fans 15, 20 can be provided. For example, the embodiment of the cooling module 1000 shown in FIG. 6 includes a shroud assembly 100 having four fans 115 and the embodiment shown in FIG. 10 includes a shroud assembly 200 with only a single fan 215. However, the number of fans 15, 20 is not limited to the embodiments shown. Other embodiments are contemplated that can include any number of fans 15, 20. Furthermore, other embodiments are contemplated where the number of fans 15, 20 mounted on the first and second shroud portions 5, 10 is not equal. For example, in some embodiments, the first shroud portion 5 has three fans 15, 20 mounted thereon and the second should portion 10 has two fans 15, 20 mounted thereon. Referring back to FIG. 2, the closure portion 8 closes off the arcuate flow direction portions 6, such that airflow does not escape without passing over the radiators 55, 65, 75. As shown, the closure portion 8 is planar.

Referring back to FIG. 1, the first and second shroud portions 5, 10 are held against one another by a first mounting bracket 25. In the embodiment shown in FIG. 1, the first and second shroud portions 5, 10 are additionally held against one another by a second mounting bracket 30. In one embodiment, the first and second mounting brackets 25, 30 are similar or are the same, so that they are interchangeable. The first and second mounting brackets 25, 30 connect to the first and second shroud portions 5, 10 via connecting hardware 50. The connecting hardware 50 can be in the form of screws, rivets, bolts, snaps, or other fasteners. The embodiment shown in FIG. 1 also includes a center or "bow tie" mounting bracket 31. This is also referred to as the connecting bracket 31. While the first and second mounting brackets 25, 30 can be the sole structure that retains the first shroud portion 5 against the second shroud portion 10, the center mounting bracket 31 further stabilizes the connection between the first and second shroud portions 5, 10. In the illustrated embodiment, the center mounting bracket 31 includes four fingers 32. Each finger 32 extends away from a center portion 33 of the connecting bracket 31. Each finger 32 includes a connection to one of the first shroud portion 5 and the second shroud portion 10, such that two of the fingers 32 connect to the first shroud portion 5 and two of the fingers 32 connect to the second shroud portion 10. The center mounting bracket 31 is attached to the first and second shroud portions 5, 10 via connecting hardware 50.

The first and second mounting brackets 25, 30 also serve to connect the shroud assembly 1, and the entire cooling module 1000, to a vehicle frame 4. The vehicle 4' is a motor vehicle. The first and second mounting brackets 25, 30 therefore support the first and second should portions 5, 10, the first and second fans 15, 20, and radiators 55, 65, 75 (See FIG. 2) on the vehicle frame 4. In some embodiments, the first and second mounting brackets 25, 30 serve as the only structural support for the first and second should portions 5, 10, the first and second fans 15, 20, and the radiators 55, 65, 75 within the vehicle 4'. Stated otherwise, the first and second mounting brackets 25, 30 carry substantially the entire structural load of the shroud assembly 1 and of the cooling module 1000. While other connections to the vehicle 4' may exist (i.e., the radiators 55, 65, 75 may have coolant line connections, and the first and second fans 15, 20 may have electrical connections 580, 680) that physically touch other portions of the vehicle 4', these connections do not carry substantially the entire structural load of the shroud assembly 1 and of the cooling module 1000.

The first and second mounting brackets 25, 30 shown in FIG. 1 are mounted to the vehicle 4' via isolators 35A, 35B, 35C, and 35D. As best seen in FIG. 2, the isolators 35A-35D include a rigid component 36 (in one embodiment a metal material or plastic material) having an internal passage for a fastener 50 to pass therethrough. A resilient component 37 surrounds the rigid component 36. The resilient component 37 can be formed from rubber. When installed, the resilient component 37 passes through the first or second mounting bracket 25, 30, to interact with the first or second mounting bracket 25, 30. The rigid component 36 is connected directly to vehicle frame 4 via a fastener 50 that passes through the internal passage of the rigid component 36. As a result, the resilient component 37 serves to damp vibration from the vehicle 4' (resulting from e.g., road vibration, engine vibration, inputs from vehicle loading, etc.) as these vibrations pass from the vehicle 4' and into the rigid component 36. Thus, these vibrations are limited or eliminated from passing into the first and second mounting brackets 25, 30, thereby also limiting or eliminating vibrations that pass from the vehicle 4' into the cooling module 1000. As a result, the service life of the cooling module 1000 is improved. While two isolators 35A-35D are shown with each of the first and second mounting bracket 25, 30, more or less isolators 35A-35D can be used with each of the first and second mounting bracket 25, 30 to achieve similar results.

Advantageously, by providing two isolators in each of the first and second mounting brackets 25, 30, two connection points are provided between the first and second mounting brackets 25, 30 and the vehicle frame 4. Having two connection points limits twisting and rotational forces on the other components of the cooling module 1000, such as radiators 55, 65, 75 (see FIG. 2). As one example of such a force, the motion of the vehicle 4' can cause the cooling module 1000 to rotate about an axis extending from the first mounting bracket 25 to the second mounting bracket 30. This rotational force is mitigated by providing two connection points in the first frame bracket 25 and the second frame bracket 30. By limiting the twisting and rotational forces on the radiators 55, 65, 75, the cooling module 1000 does not require tie rods or other structure to limit these forces. This reduces cost and simplifies installation of the cooling module 1000 into the vehicle 4'.

Referring again to FIG. 2, the first mounting bracket 25 includes two halves, a first half 26 and a second half 27. In some embodiments, the first and second halves 26, 27 are identical, mirror images of each other. The first and second halves are joined together via a respective joining region 28, which is a surface of the first half 26 that contacts the second half 27. In some embodiments, the joining regions 28 are bonded or welded together. In other embodiments, the joining regions 28 are fastened against one another with fasteners 50, or via the first and second isolators 35A, 35B.

The first and second halves 26, 27 also include respective first and second shroud mounts 29A, 29B. As shown in FIG. 2, the first shroud mount 29A extends at a right angle away from the joining region 28 of the first half 26. Similarly, the second should mount 29B extends at a right angle away from the joining region 28 of the second half 27. The first and second shroud mounts 29A, 29B are attached to the first and second shroud portions 5, 10, respectively, with the connecting hardware 50. While not described in detail, the second mounting bracket 30 includes the same structure as the first mounting bracket 25. In some embodiments, the first and second shroud portions 5, 10 have a planar surface on a portion of the flow guiding portion 6, so that a planar portion of the first and second shroud mounts 29A, 29B is more easily attached to the first and second shroud portions 5, 10, respectively.

As best shown in FIG. 2, the cooling module 1000 includes a first radiator 55, a second radiator 65, and a third radiator 75. The first radiator 55 includes at least one radiator pin 45. When the first radiator 55 is installed into the shroud assembly 1, the radiator pin 45 extends through a radiator pin aperture 40 in the first shroud portion 5 to retain the first radiator 55 in place. The radiator pin 45 extending through the radiator pin aperture 40 is shown in FIG. 1. In some embodiments, a rubber sleeve 47 is positioned around the radiator pin 45. The rubber sleeve 47 acts to damp vibration from the first shroud portion 5 (and ultimately from the vehicle 4' via the first and second mounting brackets 25, 30) so that the vibration does not fully pass into the first radiator 55. This damping serves to protect and extend the usable life of the first radiator 55.

In the embodiments shown, the first radiator 55 includes four radiator pins 45. To mount the first radiator 55 between the first and second shroud portions 5, 10, two radiator pins 45 from corners of the first radiator 55 extend through the first shroud portion 5 and two radiator pins 45 from corners of the first radiator 55 extend through the second shroud portion 10. Thus, the first and second shroud portions 5, 10 each have two radiator pin apertures 40 that receive the radiator pins 45. The layout of the radiator pins 45 thus results in the mounting brackets 25, 30, by retaining together the first and second shroud portions 5, 10, also retaining the radiator pins 45 in the radiator pin apertures 40, and thus locking the radiators 55, 65, 75 in place on the shroud assembly 1.

Figure 3:
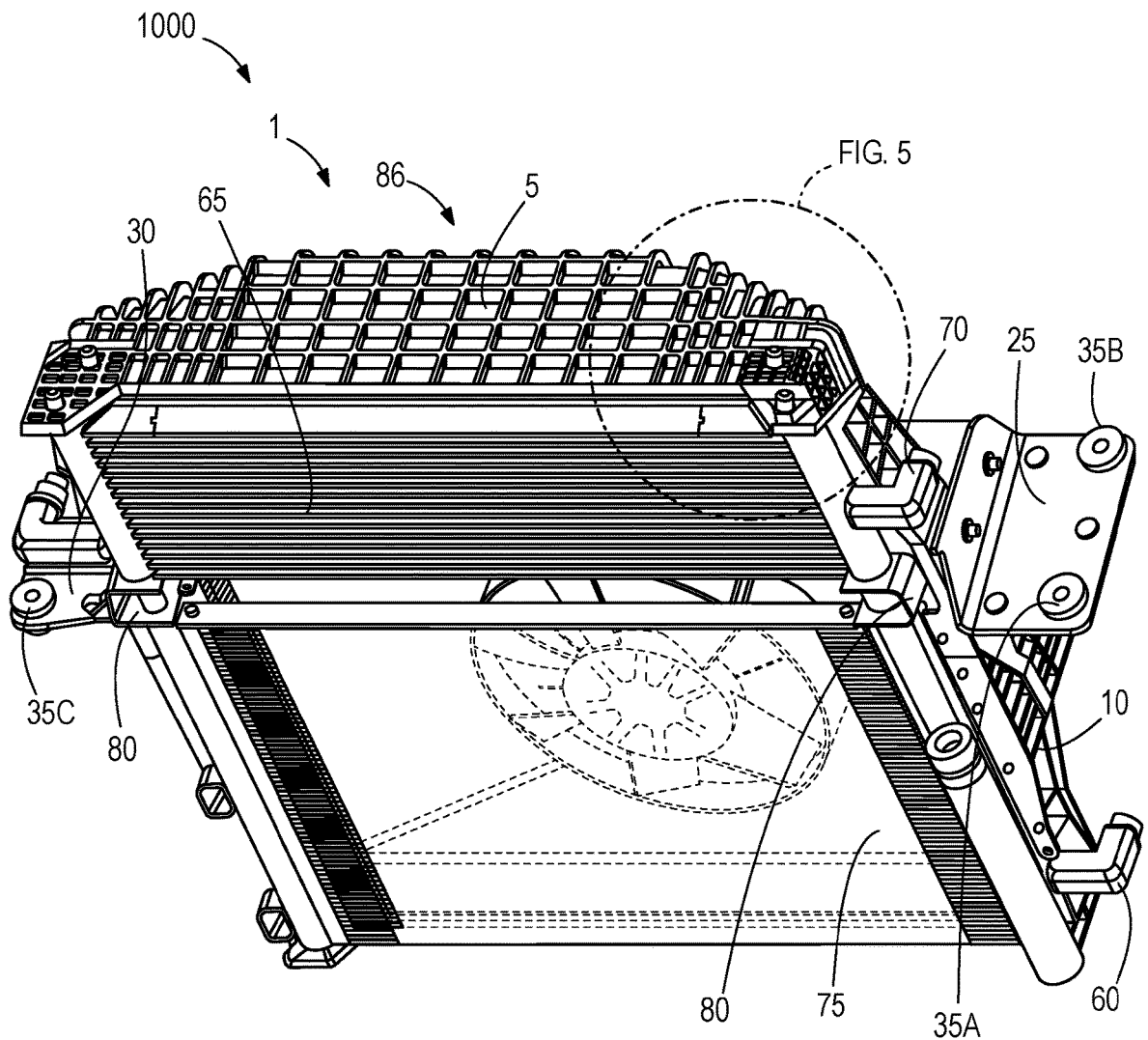
FIG. 3 is a rear isometric view of the cooling module of FIG. 1.
Figure 4:
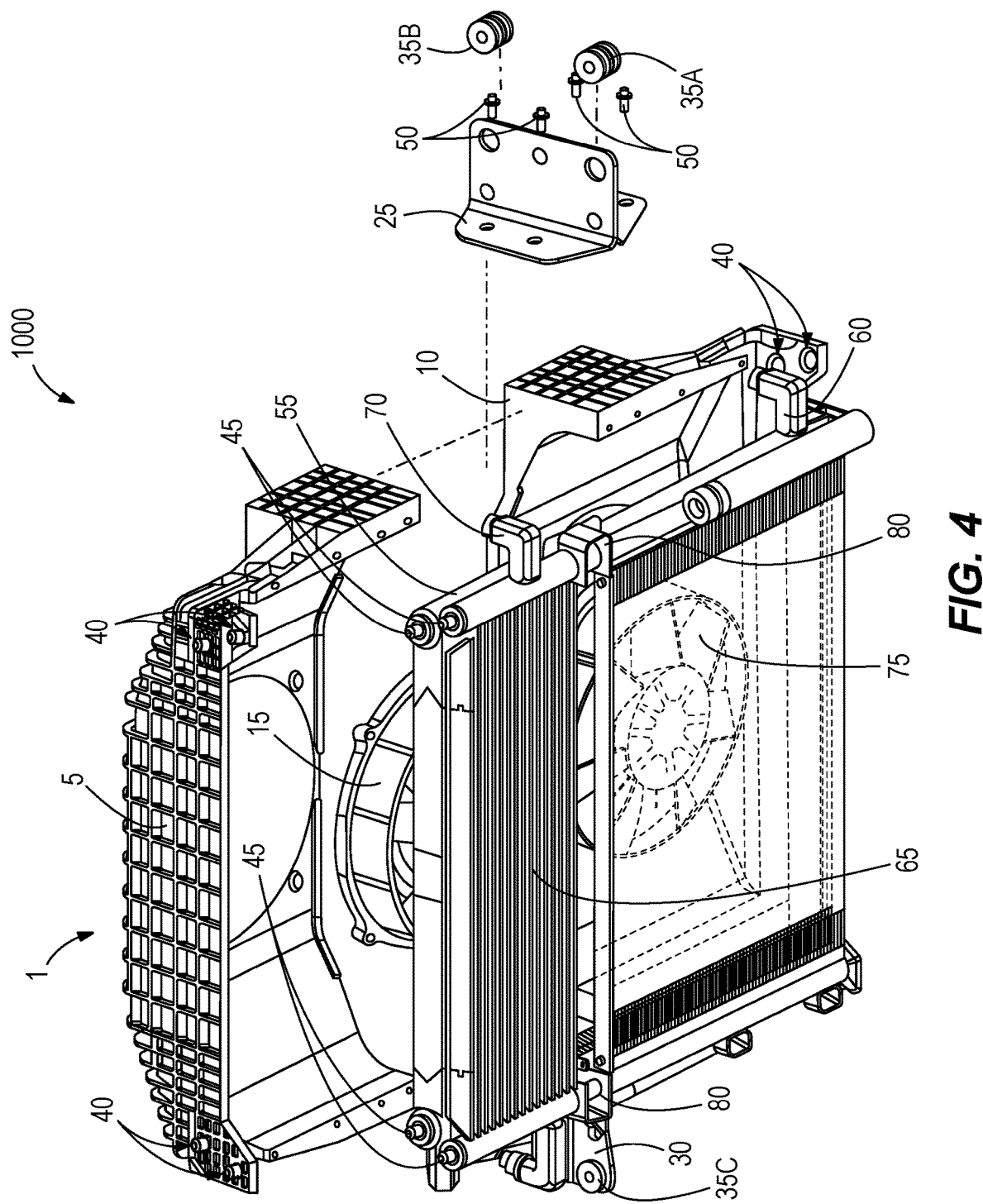
FIG. 4 is a rear assembly view of the cooling module of FIG. 1.

The second and third radiators 65, 75 are mounted in a stacked fashion. This layout differs from the first radiator 55, which extends across the entire shroud assembly 1 (i.e., from the first shroud portion 5 to the second shroud portion 10). The second radiator 65 is attached to the third radiator 75 with a radiator bracket 80. FIGS. 3 and 4 illustrate that two radiator brackets 80 are used to retain the second and third radiators 65, 75 together. Since the second and third radiators 65, 75 are mounted together within the shroud assembly 1, only two radiator pins 45 are required on each of the second and third radiators 65, 75. In the embodiments shown, two radiator pins 45 from the second radiator 65 extend through first shroud portion 5, and two radiator pins 45 from the third radiator 75 extend through the second shroud portion 10.

While the shroud assembly 1 is shown having three radiators 55, 65, 75 mounted thereon, more or less radiators 55, 65, 75 may be used with a cooling module 1000 as required by the cooling requirements for the application in which the cooling module 1000 is used. It follows that a different number or configuration of radiators 55, 65, 75 will result in a different number or configuration of the radiator pins 45, and thus a different number or configuration of the radiator pin apertures 40 in the first and second shroud portions 5, 10. A person of skill in the art understands that modifications to the radiators 55, 65, 75 could result in movement or changes to the radiator pins 45 and radiator pin apertures 40, but that still use the same pin 45 and aperture 40 mounting components as shown.

The first radiator 55 includes a first radiator connection 60, and the second radiator 65 includes a second radiator connection 70. The radiators 55, 65, 75, may include more or less connections 60, 70, as required by the cooling requirements for the application in which the cooling module 1000 is used.

FIGS. 3 and 4 illustrate different views of the cooling module 1000 and the shroud assembly 1 shown in FIGS. 1 and 2. Notably, FIGS. 3 and 4 better illustrate how the second and third radiators 65 and 75 are retained together via the radiator brackets 80, and how the two radiator pins 45 from the second radiator 65 extend through first shroud portion 5. FIG. 4 also shows in more detail how air is directed by the fans 15 (specifically, the first fan 15 is shown in FIG. 4), and over the first radiator 55 before passing over the second and third radiators 65, 75.

Figure 5:
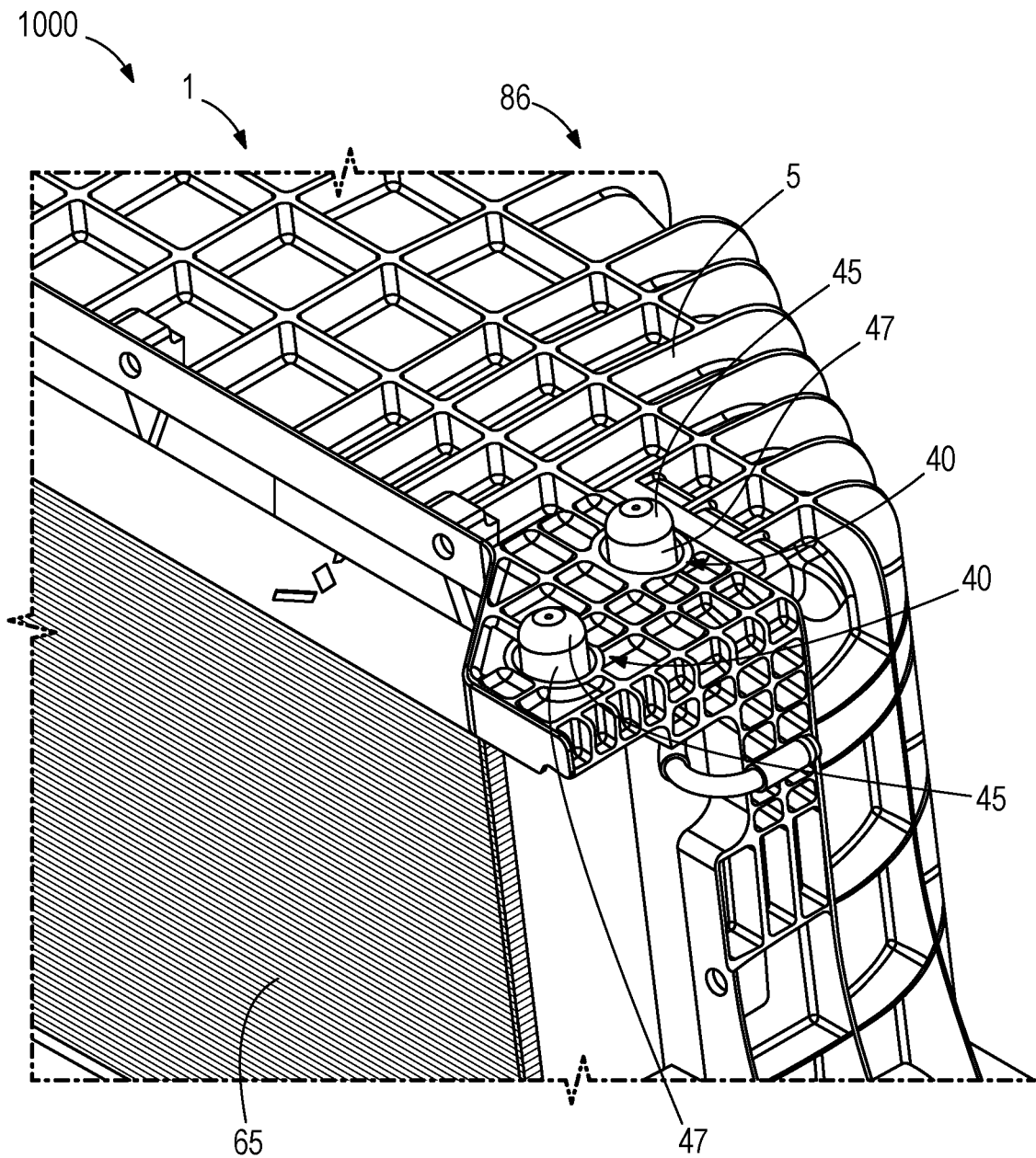
FIG. 5 is a detail view of a portion of FIG. 3 and illustrates a portion of the cooling module of FIG. 3.

FIG. 5 illustrates a detail view of the radiator pins 45 of the first radiator 55 (the first radiator 55 is obscured by the first shroud portion 5) and the second radiator 65 extend through the apertures 40 in the first shroud portion 5.

Figure 6:
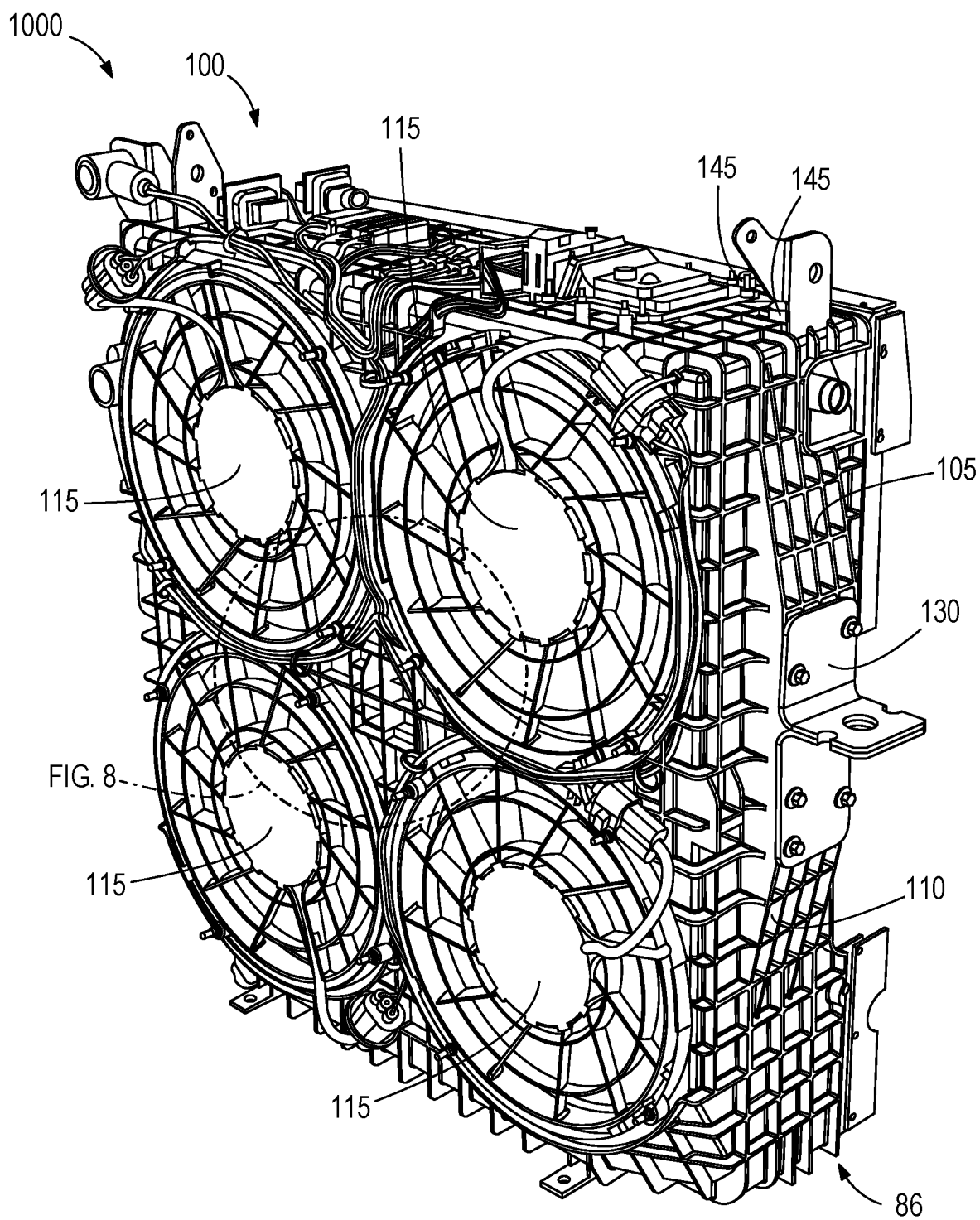
FIG. 6 illustrates a front isometric view of another embodiment of a cooling module.

FIG. 6 illustrates another embodiment of a shroud assembly 100 used in the cooling module 1000, which includes aspects that are combinable with the embodiment shown in FIG. 1. Similar features are given reference numerals incremented by 100 for easy cross-referencing between embodiments. Like the embodiment shown in FIG. 1, the shroud assembly 100 shown in FIG. 6 includes a first shroud portion 105 and a second shroud portion 110. The first and second shroud portions 105, 110 are not identical in the embodiment shown in FIG. 6, although the first and second shroud portions 105, 110 still mate together to form the shroud assembly 100 similarly to the first embodiment. The cooling module 1000 with the shroud assembly 100 includes four fans 115, two are mounted on the first shroud portion 105 and two are mounted on the second shroud portion 110. The first and second shroud portions 105, 110, are retained together via first and second mounting brackets 125, 130, although only the second mounting bracket 130 can be seen in FIG. 6. In other embodiments, more or less mounting brackets 125, 130 are provided. For example, in some embodiments, only one mounting bracket is provided (e.g., only first mounting bracket 125), and is the sole structure that retains the first and second shroud portions 105, 110 together and the sole mounting connection of the cooling module 1000 to the vehicle 4' in which the cooling module 1000 is installed.

Figure 7:
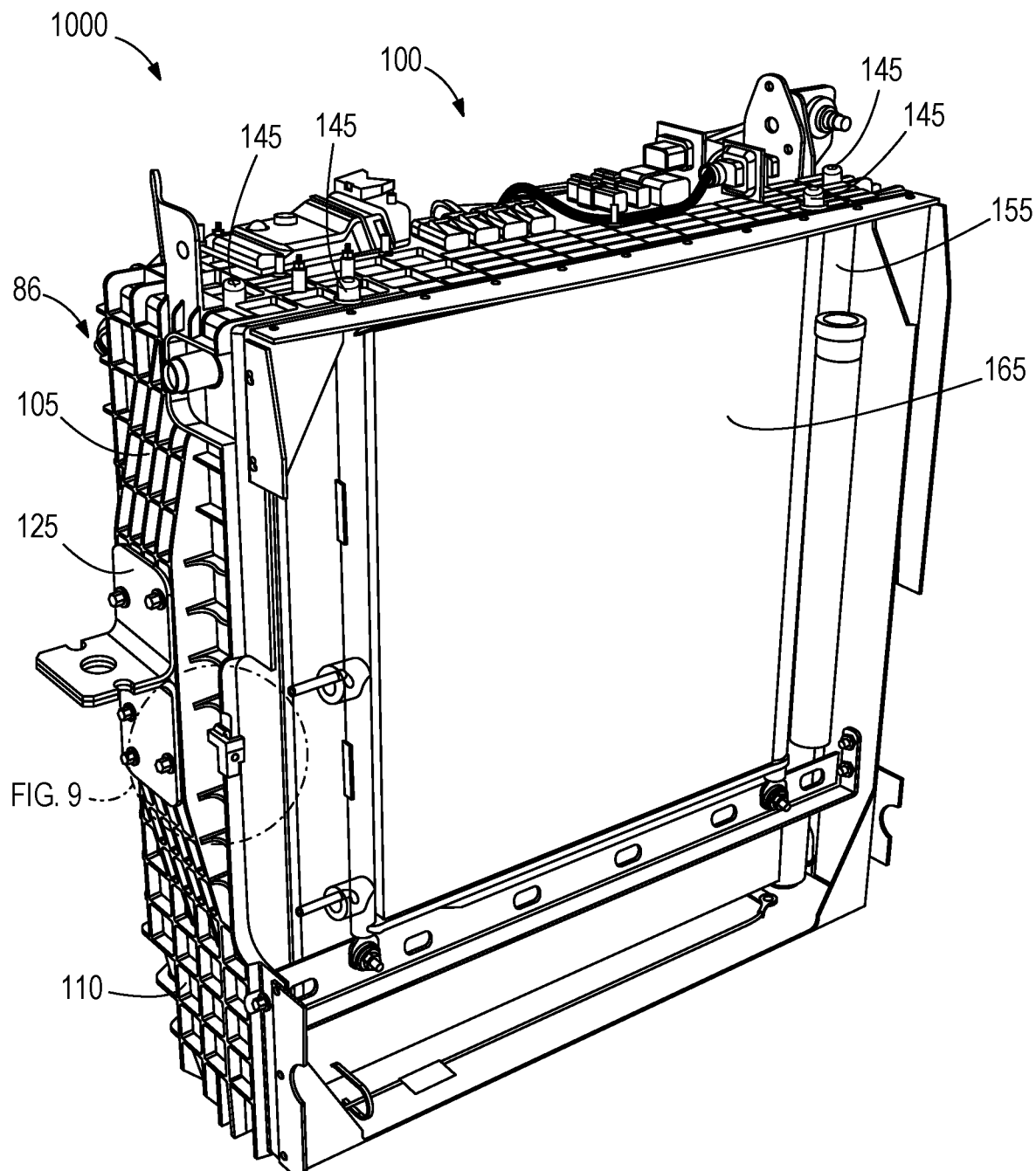
FIG. 7 is a rear isometric view of the cooling module of FIG. 6.

FIG. 7 illustrates a rear view of the cooling module 10000 and shroud assembly 100 shown in FIG. 6. Visible in FIG. 7 is the first mounting bracket 125, which is not visible in FIG. 6. FIG. 7 illustrates an alternative embodiment of the first radiator and second radiator 155, 165 when compared to the embodiment shown in FIGS. 2-4. In the embodiment shown in FIG. 7, both of the first and second radiators 155, 165 extend from the first shroud portion 105 to the second shroud portion 110. Similar to the embodiment shown in FIG. 1, and detailed in FIGS. 4 and 5, the first and second radiators 155, 165 are retained between the first and second shroud portions 105, 110 via radiator pins 145. The embodiment in FIG. 7, when contrasted with the embodiment shown in FIG. 3, is exemplary of the fact that different radiator configurations are contemplated for use with the shroud assembly 1, 100, although different radiator pin 45, 145 and associated radiator pin aperture 40 locations are required depending on the embodiment.

Figure 8:
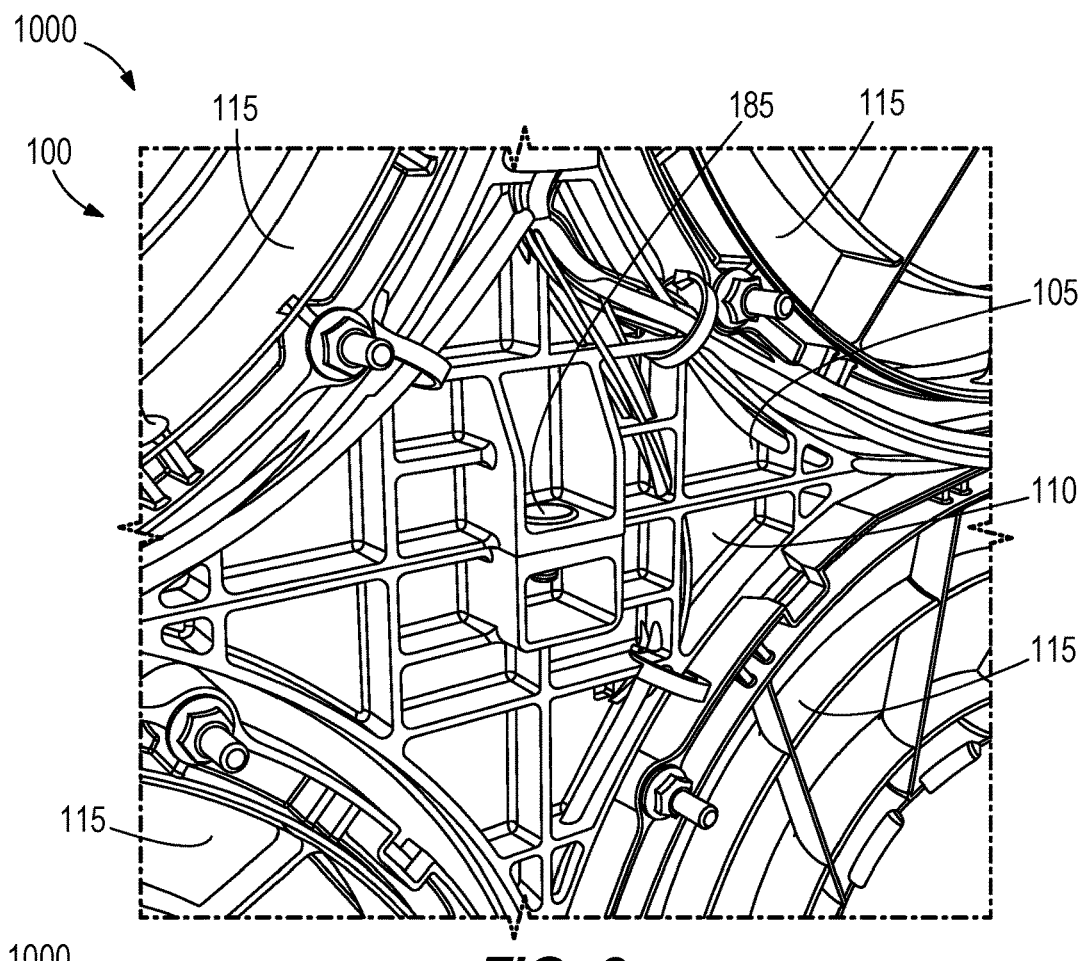
FIG. 8 is a detail view of a center portion of the cooling module of FIG. 6.

FIG. 8 illustrates a detail view of the cooling module 1000 and shroud assembly 100 shown in FIG. 6, and illustrates an interface between the first and second shroud portions 105, 110 located centrally between the four fans 115. While not required, a fastener 185 (e.g., one of the fasteners 50 discussed in more detail with respect to the embodiment shown in FIG. 1) is provided to attach the first shroud portion 105 to the second shroud portion 110. Similar to the function of the center mounting bracket 31 described in reference to the first embodiment, the fastener 185 further stabilizes the connection between the first and second shroud portions 105, 110.

Figure 9:
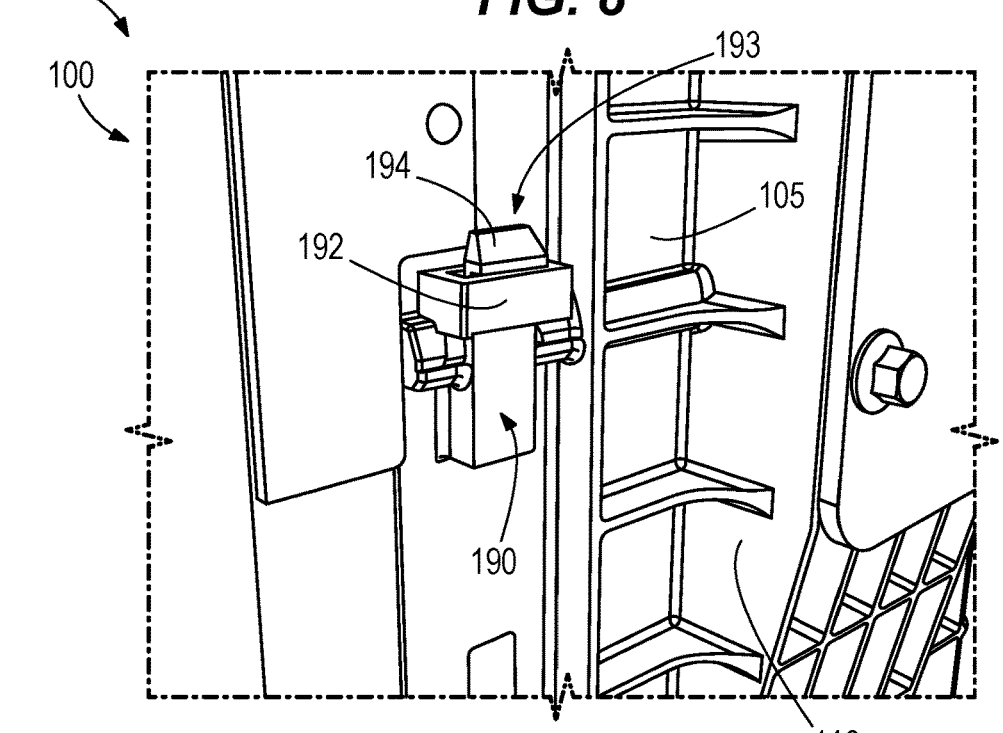
FIG. 9 is a detail view of the cooling module of FIG. 7.

FIG. 9 illustrates another embodiment of a fastener 185, which is labeled a fastener 190. FIG. 9 illustrates an interface between the first and second shroud portions 105, 110, but nearer to the first mounting bracket 125 than what is shown in FIG. 8 (See FIG. 7, which details the relative location on the cooling module 1000 that is shown in FIG. 9). The fastener shown in FIG. 9 is made up of a retainer 192 positioned on the first shroud portion 105 and an insertion portion 193 positioned on the second shroud portion 110. To retain the first shroud portion 105 against the second shroud portion 110, the insertion portion 193 is pushed through the retainer 192 such that the insertion portion 193 and the retainer 192 are elastically deformed, and a lip 194 of the insertion portion 193 passes through and abuts the retainer 192. In other embodiments, the fasteners 185, 190 may be positioned at other locations along the interface between the first and second shroud portions 105, 110 to strengthen the connection between the first and second shroud portions 105, 110.

Figure 10:
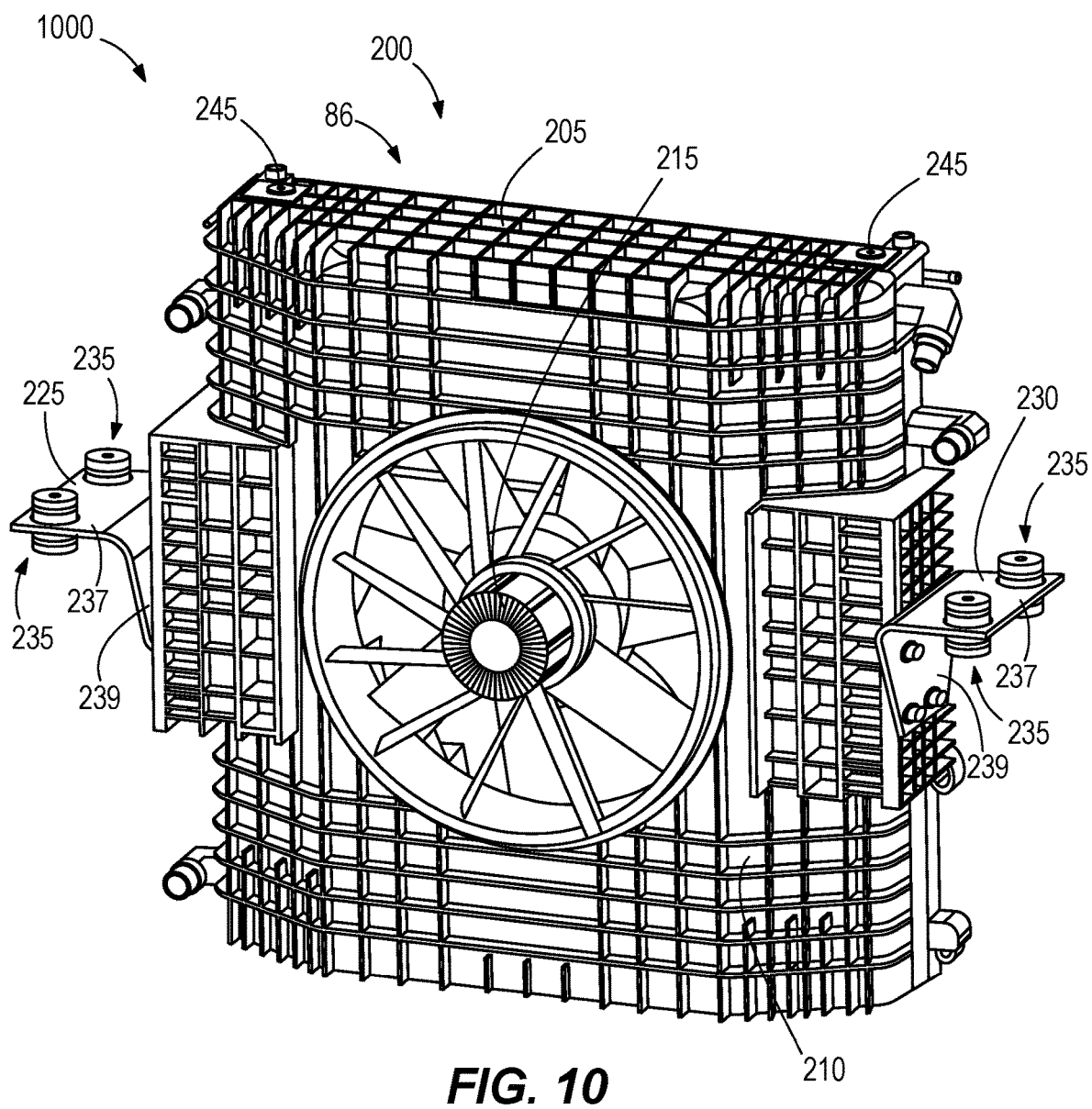
FIG. 10 illustrates a front isometric view of another embodiment of a cooling module.

FIG. 10 illustrates another embodiment of the cooling module 1000 with a shroud assembly 200, which includes aspects that are combinable with the embodiment shown in FIG. 1 and the embodiment shown in FIG. 6. Similar features are given reference numerals incremented by 200 (compared to FIG. 1) for easy cross-referencing between embodiments. Like the embodiment shown in FIGS. 1 and 6, the shroud assembly 100 shown in FIG. 10 includes a first shroud portion 205 and a second shroud portion 210. The first and second shroud portions 205, 210 are identical in the embodiment shown in FIG. 10 so that they are interchangeable, which allows for easier assembly of the shroud assembly 200. The most notable difference in the embodiment shown in FIG. 10 compared to the other embodiments shown is that the embodiment of FIGS. 10-13 only includes the single fan 215. Because the first and second shroud portions 205, 210 are identical, the fan 215 is centrally located on the shroud assembly 200, although other embodiments are contemplated where the fan 215 is located in a non-central or non-symmetrical location on the shroud assembly 200.

Unlike the embodiment shown in FIG. 6, first and second mounting brackets 225, 230 are the sole structure to retain the first shroud portion 205 against the second shroud portion 210. While other structure connecting the first and second shroud portions 205, 210 could be added, no other connection between the first and second shroud portions 205, 210 is required.

Unlike the embodiment shown in FIG. 1, the first and second mounting brackets 225, 230 only include a single "half" (See first and second halves of the mounting bracket 25 as shown in FIG. 2). Stated otherwise, the bracket 225 shown in FIG. 10 is an "L" shape, whereas the embodiment shown in FIG. 1 is a "T" shape. As better shown in FIG. 11, the different shape of the first and second mounting brackets 225, 230 results in four pieces of connecting hardware 50 positioned in one leg of the "L" shaped bracket. This differs from the embodiment shown in FIG. 1, where each half 26, 27 of the mounting bracket 25 (where each half 26, 27 is equivalent to the entire mounting bracket 225) only includes two pieces of connecting hardware. Both the mounting bracket 25 and the mounting bracket 225 have four total pieces of connecting hardware 50, with two pieces of connecting hardware 50 being anchored into the first and second shroud portions 5, 10, 205, 210, respectively.

The first and second brackets 225, 230 each include a frame flange 237 and a shroud mount 239. The frame flange 237 and the shroud mount 239 form the two legs of the "L" shape of the first and second mounting brackets 225, 230. The frame flange 237 and the shroud mount 239 can be planar flanges that extend perpendicularly away from one another. The frame flange 237 and the shroud mount 239 can be formed from a planar sheet, for example a steel sheet, that is bent into the "L" shape. The frame flange 237 is connected to the vehicle frame 4. Isolators 237 can form the connection between the frame flange 237 and the vehicle frame 4. The shroud mount 239 is connected to the first shroud portion 205 and the second shroud portion 210. The shroud mount 239 retains the first shroud portion 205 against the second shroud portion 210.

Figure 11:
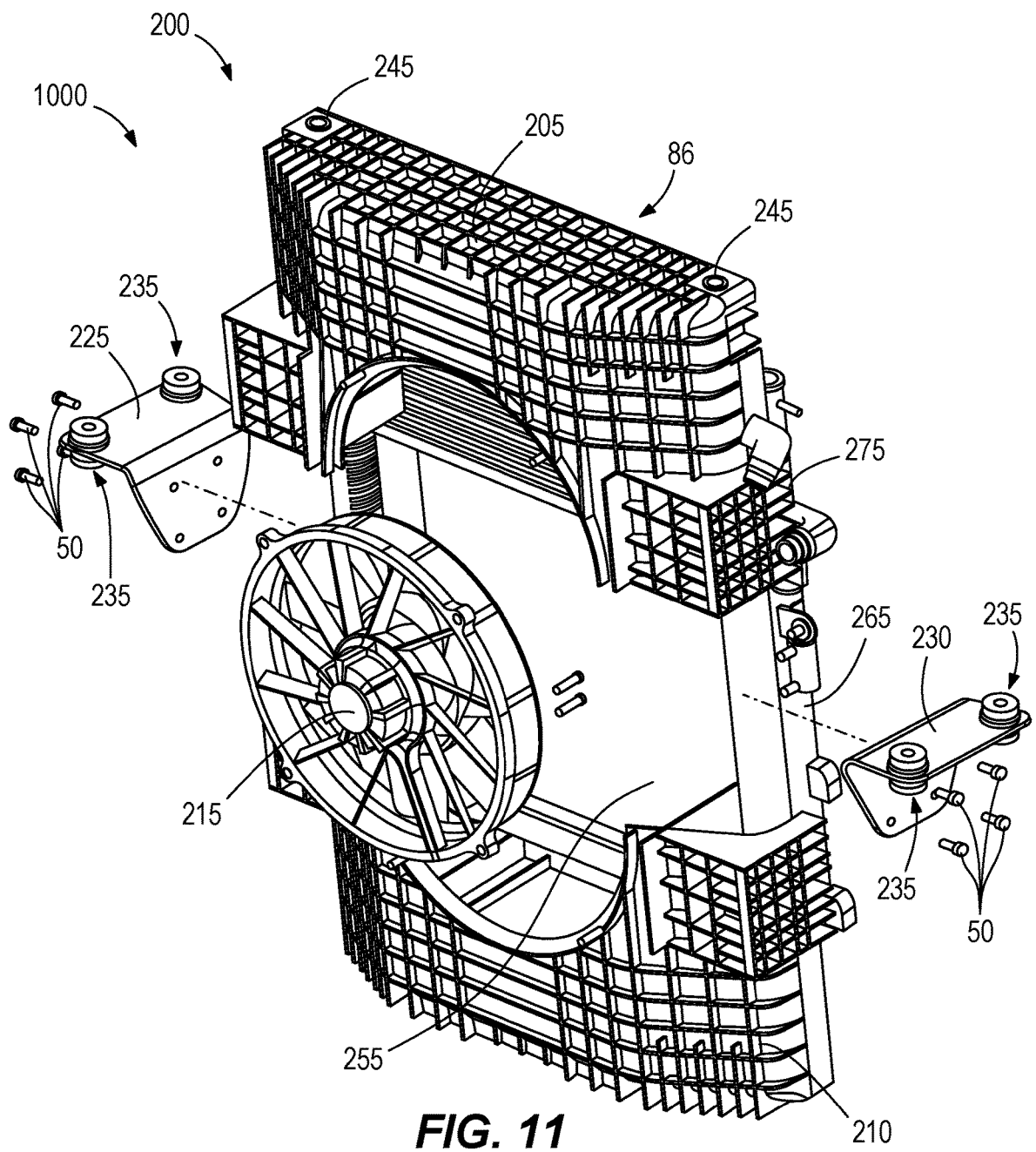
FIG. 11 is a front assembly view of the cooling module of FIG. 10.

As better seen in FIG. 11, the first and second mounting brackets 225, 230 are connected to the first and second shroud portions by connecting hardware 50. Similar to the other embodiments shown, the first and second mounting brackets 225, 230 connect to the vehicle 4' via isolators 235. The structure of the isolators 235 is described in more detail with respect to the embodiment shown in FIG. 1. In the embodiment shown in FIGS. 10 and 11, the first and second mounting brackets 225, 230 each have two isolators 235, although more or less isolators 235 are contemplated.

Figure 12:
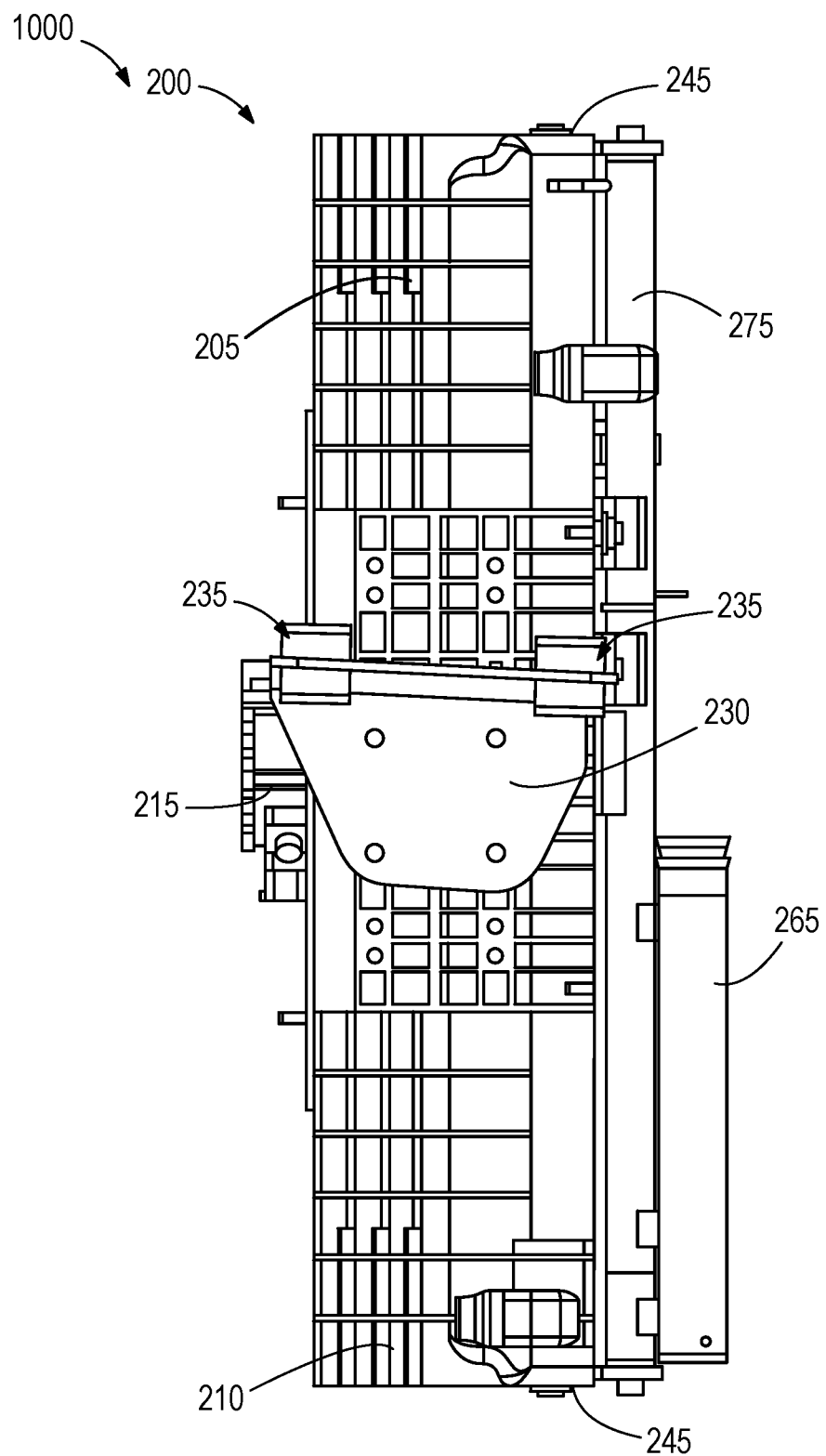
FIG. 12 is a side view of the cooling module of FIG. 10.
Figure 13:
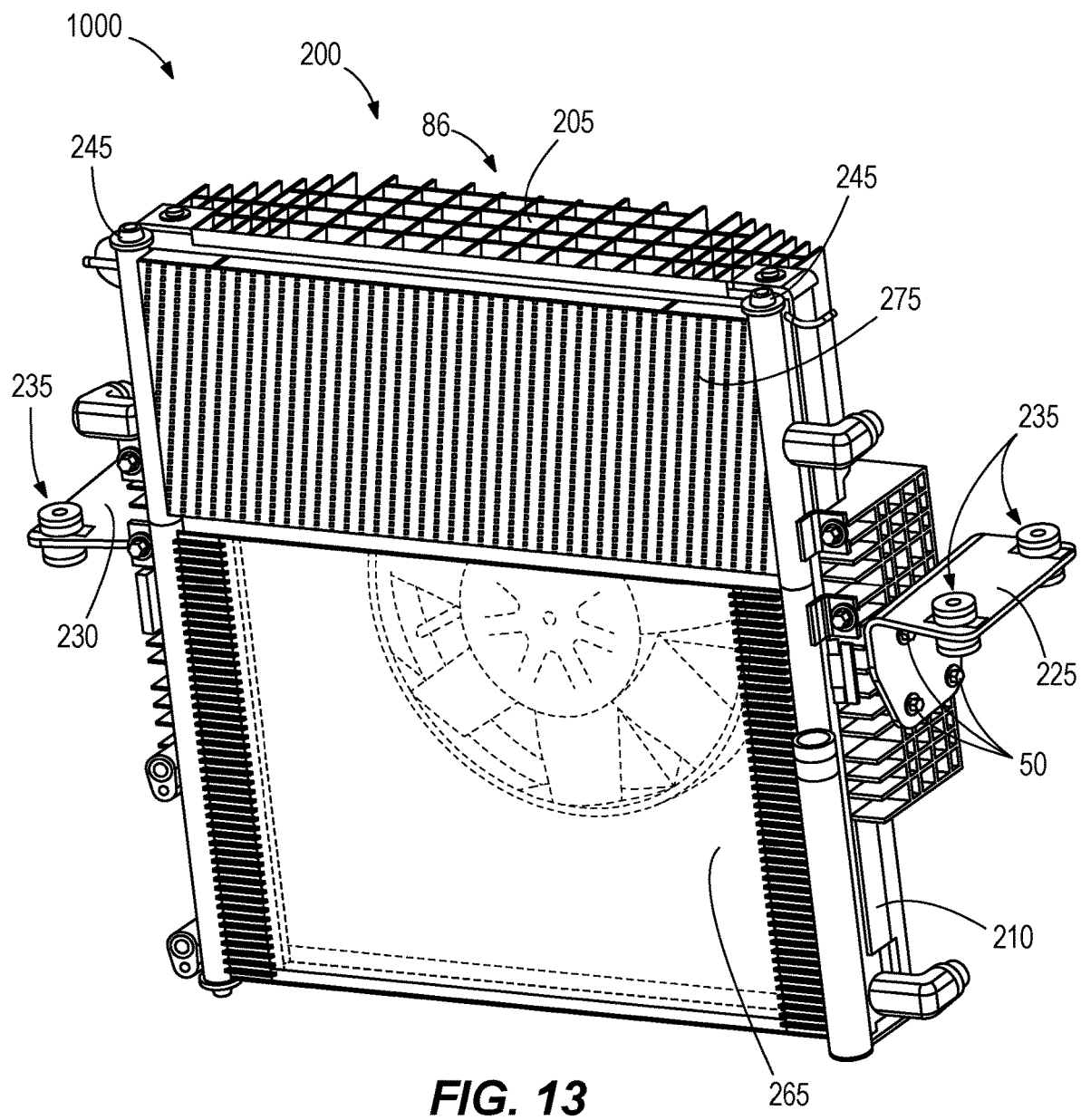
FIG. 13 is a rear isometric view of the cooling module of FIG. 10.

FIGS. 11-13 illustrate the first, second, and third radiators 255, 265, 275. Similarly to the embodiment shown in FIG. 1, the radiators 255, 265, 275 are mounted between the first and second shroud portions 205, 210, and are retained in place by radiator pins 245 that extend through radiator pin apertures 40 (see FIG. 1). The embodiment shown in FIGS. 10-13 includes three radiators 255, 265, 275, although embodiments are contemplated with more or less radiators 255, 265, 275, or different radiator 255, 265, 275 configurations, depending on the amount of cooling required for a particular application.

Figure 14:
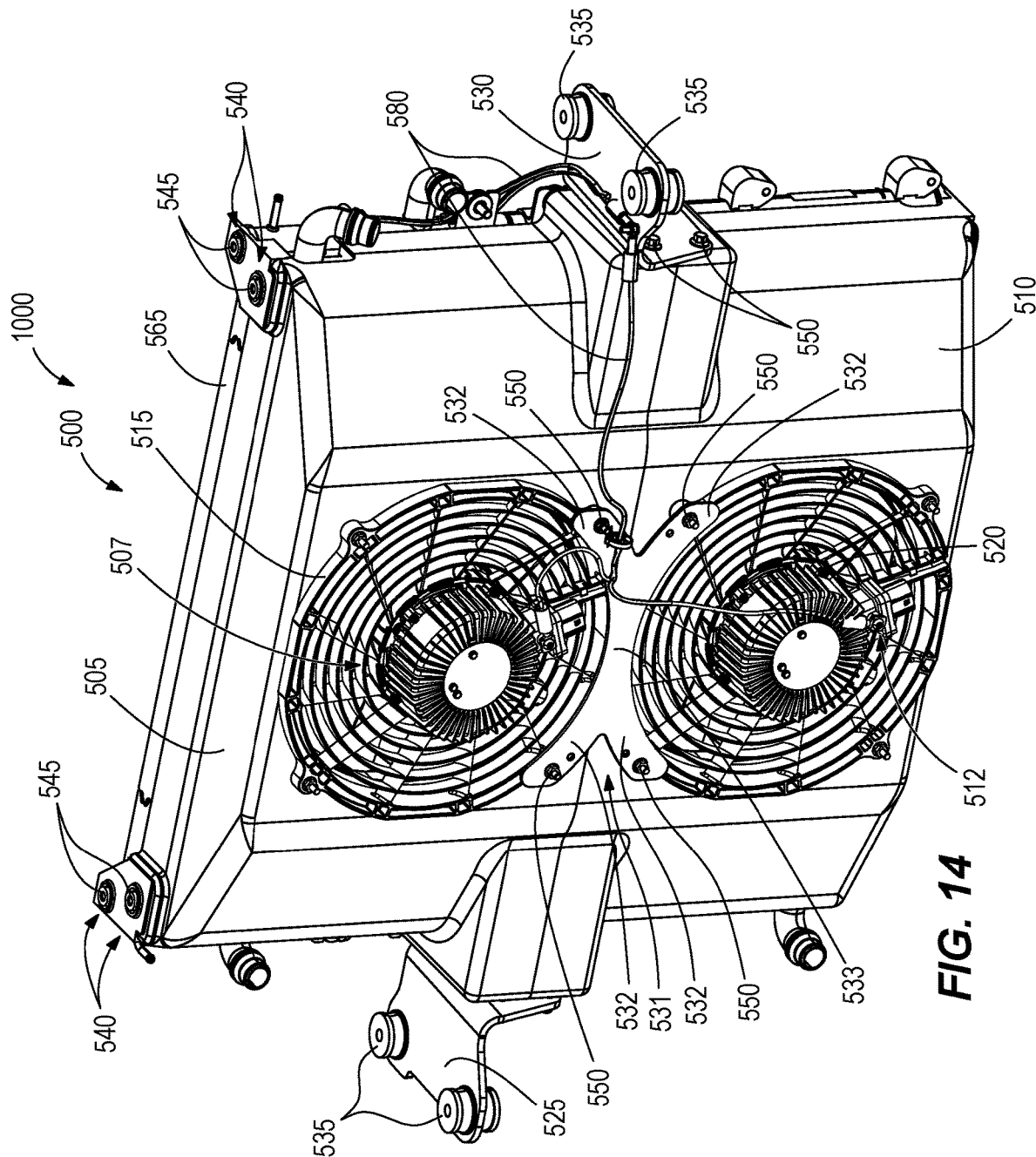
FIG. 14 illustrates a front isometric view of another embodiment of a cooling module.

FIG. 14 illustrates another embodiment of a cooling module 1000, which includes aspects that are combinable with the other embodiments shown. Similar features are given reference numerals incremented by 500 (compared to FIG. 1) for easy cross-referencing between embodiments. The embodiment shown in FIG. 14 includes two fans 515, 520 similar to the embodiment shown in FIG. 1. However, the embodiment shown in FIG. 14 differs from the embodiment shown in FIG. 1 in that the embodiment shown in FIG. 14 includes a first shroud portion 505 and a second shroud portion 510 that are formed from a metal. In some embodiments, the metal is a steel. This difference in material results in structural changes between the fan shroud assembly 1 and the shroud assembly 500 shown in FIG. 14. The first and second shroud portions 505, 510, owing to the increased structural strength of metal, do not include a lattice structure 86 like that shown in FIG. 1. Instead, the first and second shroud portions 505, 510 can be each formed from a single sheet of metal that is stamped and otherwise formed into the shape of the first and second shroud portions 505, 510.

The shroud assembly 500 includes a first shroud portion fan opening 507 and a second shroud portion fan opening 512, which are hemispherical and have the first fan 515 and the second fan 520, respectively, mounted therein. A power supply 580 provides electrical power and control operation to the first and second fans 515, 520. A first mounting bracket 525 and a second mounting bracket 530 retain the first shroud portion 505 and the second shroud portion 510 against one another. The first and second mounting brackets 525, 530 are "L" shaped like the embodiment shown in FIG. 10, although other mounting bracket structures are contemplated. The first and second mounting brackets 525, 530 each include two isolators 535 to facilitate mounting the first and second mounting brackets 525, 530 to a vehicle frame 4. Connecting hardware 550 fastens the first and second mounting brackets 525, 530 to the first and second shroud portions 505, 510.

A bowtie mounting bracket or connecting bracket 531 is positioned between the first shroud portion fan opening 507 and the second shroud portion fan opening 512, and is thus also located between the first fan 515 and the second fan 520. The connecting bracket 531 includes a center portion 533 with fingers 532 extending therefrom, where each of the fingers is connected via connecting hardware 550 to one of the first and second shroud portions 505, 510. The connecting bracket 531, with the first and second mounting brackets 525, 530, retains the first shroud portion 505 and the second shroud portion 510 against one another. The connecting bracket 531 also serves to provide additional structural support to the first and second shroud portions 505, 510.

FIG. 14 also illustrates a second radiator 565 mounted between the first and second shroud portions 505, 510. A first radiator 565 is also included, but is obscured by the first and second shroud portions 505, 510. The radiators 565 are mounted via pins 545 that extend through pin apertures 540 positioned near edges of the first and second shroud portions 505, 510. The first and second mounting brackets 525, 530, together with the connecting bracket 531, retain the pins 545 within the pin apertures 540 by retaining the first shroud portion 505 against the second shroud portion 510. By holding the first shroud portion 505 against the second shroud portion 510, the pin apertures 540 are fixed relative to one another, and the pins 540 are unable to escape from the pin apertures 540. This allows for a floating connection between the shroud assembly 500 and the radiator 565, as the pins 545 are free to move within the pin apertures 540, although this movement is limited so that the radiator 565 remains attached to the shroud assembly 500.

Figure 15:
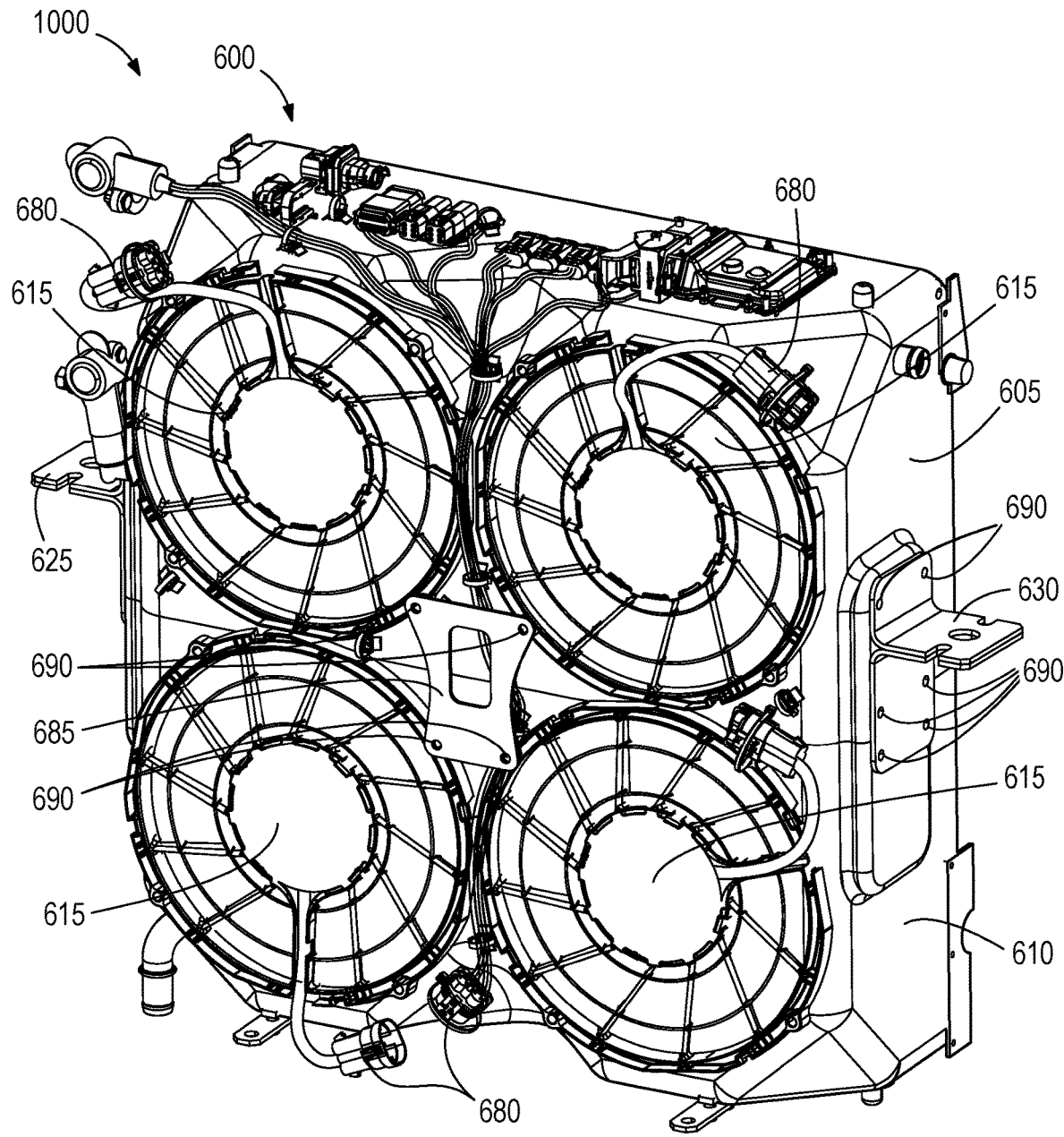
FIG. 15 illustrates a front isometric view of another embodiment of a cooling module.

FIG. 15 illustrates another embodiment of a cooling module 1000, which includes aspects that are combinable with the other embodiments disclosed. Similar features are given reference numerals incremented by 600 (compared to FIG. 1) for easy cross-referencing between embodiments. The embodiment shown in FIG. 15 is similar to the embodiment shown in FIG. 6 in that the shroud assembly 600 includes openings for four fans 615, two of which are in the first shroud portion 605 and two of which are in the second shroud portion 610. A power supply 680 provides electrical power and control operation to the fans 615. Like the embodiment shown in FIG. 14, the embodiment shown in FIG. 15 differs from the embodiment shown in FIG. 6 in that the embodiment in FIG. 15 is formed from a metal, for example a steel. In some embodiments, the first and second shroud portions 605, 610 are each formed from a single sheet of metal that is formed into the shape shown in FIG. 15.

A first mounting bracket 625, a second mounting bracket 630, and a connecting bracket 685 serve to connect the first shroud portion 605 and the second shroud portion 610. The connecting bracket 685 is centrally located between the four fans 615, and is a planar bracket that is connected via fasteners 690 to the first shroud portion 605 and the second shroud portion 610. The connecting bracket 685 can be formed from a plastic or from a metal. The first and second mounting brackets 625, 630 are similar to the "T" shaped mounting brackets illustrated in FIG. 6, but include six fastener locations 690 for connecting the first and second mounting brackets 625, 630 to the first and second shroud portions 605, 610.

Various additional features and advantages of the invention are shown in the figures, which illustrate a to-scale version of some embodiments of the invention.

What is claimed is:
1. A cooling module comprising:
a shroud assembly, the shroud assembly comprising:
   a shroud including:
      a first shroud portion having a first opening that is hemispherical,
      a second shroud portion having a second opening that is hemispherical,
      a first mounting bracket configured to mechanically join the first shroud portion and the second shroud portion, and a second mounting bracket configured to mechanically join the first shroud portion and the second shroud portion;

a radiator mounted between the first shroud portion and the second shroud portion such that the first and second mounting brackets, in mechanically joining the first shroud portion and the second shroud portion, also retain the radiator between the first shroud portion and the second shroud portion; and a fan mounted within at least one of the first shroud portion and the second shroud portion, the fan being configured to pass air through the shroud and over the radiator, wherein the first and second mounting brackets are configured to attach the shroud assembly, the radiator, and the fan to a vehicle frame.

2. The cooling module of claim 1, wherein the first opening in the first shroud portion and the second opening in the second shroud portion define opposite hemispheres of a single, circular opening, and wherein only one fan is mounted within the singular, circular opening.

3. The cooling module of claim 1, wherein the fan is a first fan, wherein the first fan is mounted within the first opening, and wherein a second fan is mounted within the second opening.

4. The cooling module of claim 3, wherein the shroud assembly includes a connecting bracket that, together with the first and second mounting brackets, retains the first shroud portion against the second shroud portion, and wherein the connecting bracket is positioned between the first opening and the second opening.

5. The cooling module of claim 4, wherein the connecting bracket includes four fingers, each finger extending away from a center portion, wherein two of the four fingers include a connection to the first shroud portion, and wherein two of the four fingers include a connection to the second shroud portion.

6. The cooling module of claim 3, wherein the first shroud portion includes a third opening and a third fan is mounted within the third opening, and wherein the second shroud portion includes a fourth opening and a fourth fan is mounted within the fourth opening.

7. The cooling module of claim 6, wherein a fastener is positioned centrally between the first, second, third, and fourth openings, the fastener retaining the first shroud portion against the second shroud portion.

8. The cooling module of claim 1, wherein the first mounting bracket includes a first half and a second half, wherein the first half includes a joining region and a shroud mount, wherein the second half includes a joining region and a shroud mount, wherein the joining region of the first half is connected to the joining region of the second half, wherein the shroud mount of the first half is connected to the first shroud portion, and wherein the shroud mount of the second half is connected to the second shroud portion.

9. The cooling module of claim 8, wherein the second mounting bracket includes a first half and a second half, wherein the first half includes a joining region and a shroud mount, wherein the second half includes a joining region and a shroud mount, wherein the joining region of the first half is connected to the joining region of the second half, wherein the shroud mount of the first half is connected to the first shroud portion, wherein the shroud mount of the second half is connected to the second shroud portion, and wherein the second mounting bracket is positioned at an opposite side of the first shroud portion from the first mounting bracket.

10. The cooling module of claim 9, wherein, in the first and in the second mounting brackets, the joining region of the first half and the shroud mount of the first half are formed from a single metal sheet that is bent such that the shroud mount of the first half extends obliquely away from the joining region of the first half, and the joining region of the second half and the shroud mount of the second half are formed from a single metal sheet that is bent such that the shroud mount of the second half extends obliquely away from the joining region of the second half, such that the first mounting bracket and the second mounting bracket both form a "T" shape.

11. The cooling module of claim 1, wherein the first mounting bracket includes a frame flange and a shroud mount, wherein the shroud mount is a single, planar sheet of material that connects to the first shroud portion and to the second shroud portion, and wherein the frame flange extends from the shroud mount and includes two isolators configured to connect to the vehicle frame.

12. The cooling module of claim 11, wherein the second mounting bracket includes a frame flange and a shroud mount, wherein the shroud mount is a single, planar sheet of material that connects to the first shroud portion and to the second shroud portion, wherein the frame flange extends from the shroud mount and includes two isolators configured to connect to the vehicle frame, and wherein the second mounting bracket is positioned at an opposite side of the first shroud portion from the first mounting bracket.

13. The cooling module of claim 12, wherein the first mounting bracket is formed from a single metal sheet that is bent such that the shroud mount of the first mounting bracket extends obliquely away from the frame flange of the first mounting bracket, and wherein the first mounting bracket forms an "L" shape.

14. The cooling module of claim 1, wherein the first mounting bracket includes two isolators configured to connect to the vehicle frame, and wherein the second mounting bracket includes two isolators configured to connect to the vehicle frame.

15. The cooling module of claim 14, wherein the isolators include rubber.

16. The cooling module of claim 1, wherein the first shroud portion and the second shroud portion are formed from a plastic, and wherein the first shroud portion and the second shroud portion include a lattice structure formed from a plurality of walls crossing at oblique angles to one another.

17. The cooling module of claim 1, wherein the first shroud portion is formed from a single sheet of metal, and wherein the second shroud portion is formed from another single sheet of metal.

18. The cooling module of claim 17, wherein the metal is steel.

19. The cooling module of claim 1, wherein the radiator includes radiator pins for mounting the radiator,
wherein the first shroud portion includes at least two pin apertures,
wherein the second shroud portion includes at least two pin apertures, and
wherein the radiator pins extend through the pin apertures of the first shroud portion or of the second shroud portion to mount the radiator to the shroud.

20. The cooling module of claim 1, wherein the radiator is one of a plurality of radiators, and
wherein the plurality of radiators are mounted between the first shroud portion and the second shroud portion.

\* \* \* \* \*